US005507949A

United States Patent [19]
Ho

[11] Patent Number: 5,507,949
[45] Date of Patent: Apr. 16, 1996

[54] SUPPORTED LIQUID MEMBRANE AND SEPARATION PROCESS EMPLOYING SAME

[75] Inventor: Sa V. Ho, St. Louis, Mo.

[73] Assignee: Monsanto Company, St. Louis, Mo.

[21] Appl. No.: 5,471

[22] Filed: Feb. 3, 1993

Related U.S. Application Data

[63] Continuation-in-part of Ser. No. 854,945, Mar. 20, 1992, abandoned.

[51] Int. Cl.$^6$ ........................................... B01D 61/38
[52] U.S. Cl. ........................... 210/490; 210/500.36
[58] Field of Search ........................... 210/643, 638, 210/634, 657, 653, 644, 500.36, 490

[56] References Cited

U.S. PATENT DOCUMENTS

| | | | |
|---|---|---|---|
| 3,410,794 | 3/1966 | Li | 210/643 |
| 3,801,404 | 4/1974 | Druin et al. | 156/229 |
| 3,816,524 | 6/1974 | Grinstead. | |
| 3,819,806 | 6/1974 | Ward III et al. | 423/220 |
| 3,839,516 | 6/1974 | Williams et al. | 264/171 |
| 3,843,761 | 10/1974 | Bierenbaum et al. | 264/154 |
| 3,959,173 | 5/1976 | Li et al. | 210/643 |
| 3,969,265 | 7/1976 | Singhal et al. | 210/643 |
| 4,001,147 | 1/1977 | Chamberlin et al. | 525/375 |
| 4,011,160 | 3/1977 | Chamberlin et al. | 210/692 |
| 4,014,785 | 3/1977 | Li et al. | 210/643 |
| 4,055,696 | 10/1977 | Kamada et al. | 264/209.5 |
| 4,066,505 | 1/1978 | Schneider. | |
| 4,086,163 | 4/1978 | Cahn et al. | 210/638 |
| 4,089,653 | 5/1978 | Ward III | 423/232 |
| 4,089,778 | 5/1978 | Gauger | 210/638 |
| 4,119,408 | 10/1978 | Matson | 423/232 |
| 4,147,754 | 4/1979 | Ward III | 423/224 |
| 4,174,374 | 11/1979 | Matson | 423/232 |
| 4,237,237 | 12/1980 | Jarre et al. | 210/692 |
| 4,244,816 | 1/1981 | Vogler et al. | 210/638 |
| 4,255,376 | 3/1981 | Soehngen | 264/154 |
| 4,257,997 | 3/1981 | Soehngen et al. | 264/154 |
| 4,276,179 | 6/1981 | Soehngen | 210/679 |
| 4,278,548 | 7/1981 | Bettinger et al. | 210/639 |
| 4,292,181 | 9/1981 | Li et al. | 210/638 |
| 4,303,531 | 12/1981 | Kawabata et al. | 210/663 |
| 4,337,154 | 6/1982 | Fukuchi et al.. | |
| 4,360,448 | 11/1982 | Li et al. | 210/643 |
| 4,405,688 | 9/1983 | Lowery et al. | 210/500.23 |
| 4,437,994 | 3/1984 | Baker | 210/638 |
| 4,459,326 | 7/1984 | Colombo. | |
| 4,544,779 | 10/1985 | Bright. | |
| 4,575,568 | 3/1986 | Yuhas, Jr. et al. | 568/750 |
| 4,705,544 | 11/1987 | Okita et al. | 540/465 |
| 4,710,205 | 12/1987 | Deetz et al. | 55/158 |
| 4,734,112 | 3/1988 | Okita et al. | 210/638 |
| 4,747,949 | 5/1988 | Barkey | 210/638 |
| 4,762,899 | 8/1988 | Shikinami | 528/49 |
| 4,780,114 | 10/1988 | Quinn et al. | 423/210.5 |
| 4,789,468 | 12/1988 | Sirkar | 210/137 |
| 4,802,987 | 2/1989 | Black | 210/653 |
| 4,808,313 | 2/1989 | Michizuki et al. | 210/500.28 |
| 4,816,407 | 3/1989 | Matson | 210/644 X |
| 4,824,443 | 4/1989 | Matson et al.. | |
| 4,851,124 | 7/1989 | Vandegrift et al.. | |
| 4,886,598 | 12/1989 | Barkey | 210/506 |
| 4,935,144 | 6/1990 | Pasternak et al. | 210/640 |
| 4,944,881 | 7/1990 | Michizuki et al. | 210/640 |
| 4,948,511 | 8/1990 | Swanson et al. | 210/634 |
| 4,961,758 | 10/1990 | Dobitz | 585/818 |
| 4,966,707 | 10/1990 | Cussler et al. | 210/632 |
| 4,968,430 | 11/1990 | Hildenbrand et al. | 210/640 |
| 4,973,434 | 11/1990 | Sirkar et al. | 428/398 |

(List continued on next page.)

FOREIGN PATENT DOCUMENTS

| | | |
|---|---|---|
| 1058525 | 7/1979 | Canada. |
| 0297252A2 | 5/1988 | European Pat. Off.. |
| 0296098 | 12/1988 | European Pat. Off.. |
| 0561759A1 | 3/1993 | European Pat. Off.. |
| 93870053.1 | 3/1993 | European Pat. Off.. |
| 8531857 | 12/1985 | United Kingdom. |
| 2169301 | 7/1986 | United Kingdom. |
| WO90/06168 | 6/1990 | WIPO. |

OTHER PUBLICATIONS

Fox, Chester R., "Remove and Recover Phenol," Hydrocarbon Processing, pp. 109–111 (1975).

Tsuchida et al., "Adsorption of Phenols on Polymers in Aqueous Solution," European Polymer Journal, vol. 13, pp. 269–272.

Jendrychowska–Bonamour et al., "Greffage Radiochimique De L'Acrylonitrile Sur Le Polystyrene–1," European Polymer Journal, vol. 13, p. 241 (1977).

Klemetson et al., "Ultrafiltration and Hyperfiltration of Phenolic Compounds in Coal Gasification Wastewater Streams," Prog. Wat. Tech., vol. 10, pp. 479–491, (1978).

Fox, Chester R., "Plant Uses Prove Phenol Recovery With Resins," Hydrocarbon Processing pp. 269–273 (1978).

Fox, C. R., "Removing Toxic Organics From Waste Water," CEP (1979).

Krishnakumar et al., "A Novel Method of Recovering Phenolic Substances From Aqueous Alkaline Waste Streams," Ind. Eng. Chem. Process Des. Dev., pp. 410–413 (1984).

Danesi et al., "Lifetime of Supported Liquid Membranes:.. .," Journal of Membrane Science, pp. 117–145 (1987).

Noble et al., "Facilitated Transport Membrane Systems," Chem. Eng. Prog. pp. 58–70 (1989).

Deblay et al., "Selection of Organic Phases for Optimal Stability and Efficiency of Flat–Sheet Supported Liquid Membranes," Sep. Sci. and Tech., pp. 97–116 (1991).

J. of Membrane Science, 36 (1988) 331–342

W. Gudernatsch et al, Recovery and Concentration of High Vapour Pressure Bioproducts by Means of Controlled Membrane Separation.

K. B. Hvid, P. S. Nielsen and F. F. Stengaard, "Preparation and Characterization Of A New Ultrafiltration Membrane", Nov. 15, 1989–Revised Mar. 29, 1990; pp. 189–202.

*Primary Examiner*—Frank Spear
*Attorney, Agent, or Firm*—Kenneth D. Goetz

[57] ABSTRACT

An immobilized liquid membrane and a method for selective extraction using same wherein said membrane comprises a hydrophobic polyamphiphilic oligomeric or polymeric liquid supported or immobilized within a microporous support which may be hydrophobic.

25 Claims, No Drawings

U.S. PATENT DOCUMENTS

| | | | |
|---|---|---|---|
| 4,973,606 | 11/1990 | Sterzel et al. | 524/204 |
| 4,973,775 | 11/1990 | Sugier et al. . | |
| 4,985,147 | 1/1991 | Mochizuki et al. | 210/500.27 |
| 4,988,443 | 1/1991 | Michaels et al. | 210/631 |
| 4,997,569 | 3/1991 | Sirkar | 210/637 |
| 5,015,560 | 5/1991 | Koboshi et al. | 210/692 |
| 5,028,339 | 7/1991 | Clark, III | 210/692 |
| 5,030,672 | 7/1991 | Hann et al. | 528/171 |
| 5,043,073 | 8/1991 | Brunner et al. . | |
| 5,049,275 | 9/1991 | Gillberg-LaForce et al. | 210/500.27 |
| 5,100,555 | 3/1992 | Matson | 210/651 X |
| 5,135,355 | 10/1992 | Mildenberger et al. . | |
| 5,179,190 | 1/1993 | Regen | 528/272 |

SUPPORTED LIQUID MEMBRANE AND SEPARATION PROCESS EMPLOYING SAME

BACKGROUND OF THE INVENTION

This is a continuation-in-part of U.S. application Ser. No. 07/854,945, filed Mar. 20, 1992 now abandoned.

FIELD OF THE INVENTION

The present invention is directed to a stable supported liquid membrane (SLM) comprising an oligomeric or polymeric liquid membrane supported or immobilized within a solid microporous support which may be hydrophobic. The present invention also is directed to a process for selectively removing a dissolved species (solute or target compound), which species may be a liquid or gas, from a gaseous stream or from an aqueous solution. In other words the separation process of the present invention may be applied to a gas-gas, gas-liquid, or liquid-liquid separation. One process comprises contacting said aqueous solution and an aqueous stripping solution with opposite sides or surfaces of a supported liquid membrane comprising a hydrophobic oligomeric or polymeric liquid immobilized within a microporous support.

DESCRIPTION OF RELATED ART

Immobilized liquid membranes are known. One prevalent design uses an aqueous liquid membrane immobilized within a hydrophilic microporous membrane which in turn is supported with a hydrophobic microporous support membrane. The hydrophobic membrane is positioned on the lower pressure side of the assembly to retard expulsion of the aqueous liquid membrane from the hydrophilic membrane. Such designs are described in U.S. Pat. Nos. 3,819,806; 4,089,653; 4,115,512; 4,119,408; 4,147,754 and 4,174,374. Such immobilized liquid membranes are used to remove a gaseous component from a gaseous mixture, and, of course, would not be suitable for removing dissolved species from an aqueous solution. Often, the assembly may be further reinforced using a flat, fine mesh stainless steel screen.

U.S. Pat. No. 4,973,434 describes an immobilized aqueous liquid membrane, and a method for its preparation, wherein a hydrophobic microporous support replaces the conventionally used hydrophilic membrane. Purportedly, by using the hydrophobic support, expulsion of the aqueous liquid membrane is avoided even at substantial positive pressure differences, e.g., 175 psig. A procedure of alternatively contacting the microporous hydrophobic support with an aqueous solution of an exchange agent, such as ethyl alcohol, and with water is required to prepare the immobilized aqueous liquid membrane. Again, such a system would not be suitable for removing a dissolved specie from an aqueous solution.

In an alternative approach, generally intended for selectively extracting one or more components, the target compound(s), from a liquid mixture such as an aqueous solution, an organic liquid membrane (organic solvent) retained in the pores of a microporous hydrophobic support has been proposed. Typically, a carrier agent for enhancing the transport of the target component through the liquid membrane is dissolved or suspended in the organic solvent, such as kerosene or an alcohol. Adoption of these designs also has been impeded, however, by membrane instability problems involving loss of the organic solvent, carrier loss, osmotic imbalances and spontaneous emulsification of the liquid membrane.

Notwithstanding these problems, immobilized liquid membranes remain desirable for certain applications because they can provide a more selective and/or rapid separation than other forms of membrane transport, and in the main are easily prepared.

Thus, there remains a need in the art of immobilized liquid membranes for a system which provides the advantages inherent in this technology while minimizing the instability problems (e.g., minimum useful life) that have plagued the prior art.

U.S. Pat. No. 4,276,179 describes a process for removing by adsorption halogenated hydrocarbons from aqueous streams. According to a preferred embodiment, the aqueous media containing the halogenated hydrocarbon contacts a microporous polyolefin (e.g., polypropylene) film impregnated with a saturated or unsaturated oil, wax or fat such as mineral oil, silicone oil, vegetable oils and waxes and animal fats and waxes.

DESCRIPTION OF THE INVENTION

The present invention is directed to a supported liquid membrane (SLM) comprising a hydrophobic, oligomeric or polymeric liquid immobilized or impregnated within a microporous support. The immobilized liquid membrane of the present invention has particular utility for selectively removing (i.e., transferring) dissolved specie(s), such as organic materials and particularly polar organic compounds, from aqueous mediums, which may have a high concentration of inorganic salts.

The present invention also is directed to a process for selectively removing a dissolved specie, particularly a polar organic compound, from an aqueous media which may contain other polar organic compounds and/or a high salt concentration, by contacting one side of a supported liquid membrane, comprising a hydrophobic, oligomeric or polymeric liquid supported or immobilized within the pores of a microporous support, with the aqueous media to cause the dissolved specie to permeate or diffuse through the liquid membrane and then removing the dissolved specie from an opposite side of the supported liquid membrane. The driving force for continued transport of the dissolved specie, i.e., the polar organic compound, across the supported liquid membrane can be affinity or interaction with the pickup (strip) solution, can be the pH (using base or acid), can be vapor pressure (pervaporation) and can be degradation (biological destruction). Preferably the force is by biological degradation, by pervaporation in the case of volatile compounds or by capture in a stripping liquid.

The present invention also is directed to a process for selectively removing the dissolved specie from a gaseous stream, i.e., gas-gas separation, in a manner analogous to that described above in removing the specie from an aqueous media. In other words, the present method comprises contacting opposite sides of a supported liquid membrane described herein with said gaseous stream and a means driving the continued transport across the supported liquid membrane. The driving force can be the same as that for separation of the specie from an aqueous medium set out immediately above.

The dissolved species which permeate through the immobilized oligomeric or polymeric liquid membrane may, depending on the dissolved specie(s), be recovered from the immobilized liquid membrane, for example, by an aqueous stripping solution or is removed by evaporation, by pervaporation or by any other means by which an activity gradient is established, e.g., by reaction degradation. In a preferred practice, the dissolved specie(s) entering a stripping solution is converted into a nonpermeable form and thus is retained in the stripping solution. Through such processes, a small volume of stripping solution can be used to treat a relatively larger volume of aqueous solution efficiently. Accordingly, the present membrane and process have particular applicability in the field of water pollution control, although the invention is not limited to such applications.

By employing particular hydrophobic oligomeric or polymeric liquids as the immobilized liquid membrane, high selectivity and high transport of organic materials, and particularly polar organic compounds through supported liquid membranes have been obtained while the instability problems which have limited the utility of the liquid membrane prior art have been substantially overcome. In terms of the present invention, the hydrophobic, oligomeric or polymeric liquid should contain a plurality of generally alternating hydrophobic regions and polar regions, such that the liquid has a high affinity for organic compounds, and particularly polar organic compounds while it exhibits a low solubility in water (i.e., be substantially water-insoluble) and a low water miscibility.

As used herein, the term "hydrophobic", particularly when used in connection with the oligomeric or polymeric liquid, means that the liquid is substantially water insoluble, and water immiscible. By "water insoluble" it is meant that the oligomeric or polymeric liquid is so sparingly soluble in an aqueous solution with which it is in contact during use that it remains in the pores of the microporous support for an extended time period without dissolving into the aqueous stream. In terms of the present invention, what constitutes an extended time period depends on many factors, but basically is an economics-driven variable. Depending on the particular application, an extended time period can be from several hours to several weeks. Preferably, the hydrophobic liquid is soluble in the aqueous solution in an amount of less than about 50 ppm, more preferably less than about 30 ppm and most preferably less than about 10 ppm. By "water immiscible" it is meant that water has such a low solubility in the hydrophobic, oligomeric or polymeric liquid that very little water permeates through the liquid membrane during use. Preferably, the water solubility in the hydrophobic liquid should be less than about 10%, preferably less than about 5%, and generally it should be about 3% or lower. Particularly preferred oligomeric or polymeric liquids are those in which not only water but also highly water-soluble species, such as inorganic salts, also have a very low solubility in the hydrophobic oligomeric or polymeric liquid. Liquids which do not exhibit this combination of water insolubility and water immiscibility are not considered to be "hydrophobic" in the context of the present invention.

Another aspect of the present invention is the discovery that many of the hydrophobic, oligomeric or polymeric liquids useful in the present invention can be characterized as poly (amphiphilic) compounds. The term poly (amphiphilic) compound refers to a class of oligomers or polymers having alternating polar regions and hydrophobic regions. These regions of polarity and hydrophobicity typically alternate along the oligomer or polymer backbone in such a manner that the molecule has a high density of both polar and hydrophobic moieties. Such poly (amphiphilic) oligomers and polymers can be prepared for example by oligomerizing or polymerizing moderately polar organic monomers, preferably monomers having only a slight water solubility, or by functionalizing hydrophobic oligomers or polymers with polar moieties. Procedures and techniques for preparing such poly (amphiphilic) compounds are known to those skilled in the art and need not be specifically described. Moreover, such poly(amphiphilic) compounds are commercially available from numerous sources.

As a general rule, suitable hydrophobic, oligomeric or polymeric poly (amphiphilic) compounds contain a repeating unit such as follows:

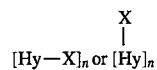

Where Hy is a hydrophobic moiety of sufficient hydrophobicity that the oligomer or polymer is essentially water insoluble and water immiscible and X is a polar moiety that contributes to a selective affinity for polar organic target compounds. The repeating value, n, is a number representing the average number of repeating units (e.g. monomer units) in the oligomer or polymer. Typically n is at least 3, usually a number somewhere between 5 and 1000, and most often is between 10 and 200. An important aspect of the present invention is that the water solubility of such poly(amphiphilic) compounds is decreased by increasing the molecular weight of such compounds, i.e., by increasing the value of n, and that this is accomplished without altering the functionality of the compound, including the relative level of the hydrophobicity and polarity of the compound.

Suitable hydrophobic moieties include a hydrocarbon moiety such as linear or branched alkylene groups, preferably containing from 3 to 7 carbon atoms, and phenylenyl groups which groups all may be substituted with other substantially hydrocarbyl groups. For example, alkylene moieties of the formula $$-CH-CH_2-$$
$$\phantom{-CH-}|$$
$$\phantom{-CH-}R$$

where R is an alkyl group of 1 to 4 carbon atoms; methyl (propylene) or ethyl (butylene) have proven to be useful. Other R substituents may include, for example, cycloalkyls of 4 to 8 carbon atoms and aryl groups, such as phenyl, alkyaryl such as enzyl and arylalkyl such as tolyl. Suitable polar moieties (X) may include moieties containing an ether linkage (—O—), an ester linkage

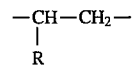

a carbonyl

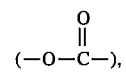

a urethane linkage

a urea linkage

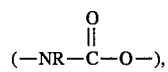

an amino (—NR—), a nitro

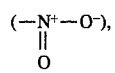

a sulfone

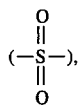

a sulfoxide

phosphine oxides

and the like where R is hydrogen or as defined above. Oligmers and polymers containing a variety of different types of alternating hydrophobic regions and polar regions are also contemplated. For example, the liquid oligomer or polymer may be a polyamine having both amino and carbonyl groups alternating with a hydrophobic moiety. In addition to oligomers and polymers consisting of repeating monomeric units, the functional portion of the polymer, i.e., X, can also be attached to a hydrophobic group to render the whole polymer water insoluble. The governing condition is that the hydrophobic, oligomeric or polymeric poly (amphiphilic) compound be a liquid under operating conditions that is substantially water insoluble and water immiscible as defined above.

There are a wide variety of known water-insoluble and water immiscible oligomeric or polymeric liquids falling within this generic definition which can be used in preparing the immobilized liquid membranes of the present invention. Either natural or synthetic hydrophobic, oligomeric and polymeric liquids potentially can be used. Representative of suitable oligomeric and polymeric liquids are polyalkylene oxides, particularly polypropylene glycols, polybutylene glycols, polytetramethylene glycols, polypentamethylene glycols, polyhexamethylene glycols and polyheptamethylene glycols, polyesters, polyureas, polyurethanes, silicone oils (such as polydimethyl siloxanes), and the like. Being oligomeric or polymeric, these liquids have a very low vapor pressure, and for all intent and purpose, are nonvolatile under normal operating conditions. Thus, such liquids are safe to handle and are highly resistant to evaporative loss from the hydrophobic microporous support.

Oligomeric and polymeric liquids also are fairly viscous which makes them more stable against physical expulsion (e.g., bleeding or weeping) from the porous matrix under relatively large static pressure differences as compared with the organic solvents of the prior art. If the viscosity of the oligomeric or polymer liquid is so high that it becomes an impediment to successful loading of the neat oligomeric or polymeric liquid into the porous matrix of the microporous support, then a carrier solvent, as described in U.S. Pat. No. 4,973,434, could be used, as needed, to form a lower viscosity solution of the liquid to facilitate loading of the more viscous oligomeric or polymeric liquids into the porous matrix of a microporous support. The carrier solvent would thereafter be removed, e.g., by evaporation, to leave the substantially pure liquid oligomer or polymer in the pores of the membrane.

As recognized by those skilled in the polymer art, the viscosity and to a certain extent the water solubility and water miscibility of such oligomeric and polymeric liquids are influenced strongly by molecular weight, which in many instances can be varied, as needed, to obtain those properties desired in the liquid oligomer or polymer conducive to enhanced membrane stability and performance. As noted above, in such oligomeric or polymeric liquids, the molecular weight can be increased to reduce water solubility without affecting the liquid's functionality. In the case of liquid polybutylene glycols, a molecular weight of above about 1000 has proven to be satisfactory, while for polypropylene glycols a molecular weight above about 2000 should be satisfactory.

For any particular application, an oligomeric or polymeric liquid will be selected or synthesized to maximize the selective affinity for the target compound(s) desired to be removed selectively from, for example, an aqueous solution and to maximize the rate of transport of the target compound(s) through the liquid membrane. An important advantage of using an oligomeric or polymeric liquid in forming the immobilized liquid membrane is that it is possible to introduce and modify various functional groups along a polymer backbone to enhance an oligomer's or polymer's selective affinity and transport rate for the component (typically a polar organic compound) targeted for transport across the liquid membrane. Such modification of the oligomeric or polymeric liquid may improve both the selectivity for the target component as well as its rate of transport through the liquid membrane.

In fact, the liquid membranes of the present invention can be used not only to recover but also to separate one or more organic compounds selectively from other organic compounds in an aqueous liquid based on differences in their physical properties such hydrophobicity, hydrogen-bonding capability, their degree of dissociation in an aqueous medium, as indicated by the pKa's and the like.

It is now found there is a correlation between partition coefficients of the known octanol/water system and the present SLM/water system.

| COMPOUND | $K_{Octanol/Water}$ | $K_{PPG-4000/Water}$ |
|---|---|---|
| Acrylic Acid | 1.35 | 5 |
| Phenol | 28.8 | 150 |
| p-Nitrophenol | 77 | 300 |
| Toluene | 537 | 1000 |

This correlation provides a basis for determining applicability of the supported liquid membrane of the present invention. See, for example, "Table 1A. Water Solubility, Vapor Pressure, Henry's Law Constant Koc, and Kow Data for Selected Chemicals" in the March 1990 Manual EPA/600/8-90/003.

It has been discovered that polyalkylene glycols (polyalkylene oxides) having the formula H [O—R$^1$]$_n$OH where R$^1$ is a linear alkylene group of 3 to 7 carbon atoms or is a substituted alkylene group of the formula

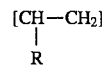

where R is as defined above, (R cannot be hydrogen in this context), and n is from 5 to 1000, and polypropylene glycols and polybutylene glycols in particular have a strong affinity for polar compounds and phenolic and related compounds such as phenol, nitrophenol, nitroaniline, and the like especially, and are especially useful for removing such compounds from aqueous solutions. Partition coefficients for these compounds, defined as the quotient or ratio of the concentration of the compound in the polyalkylene glycol phase to the concentration of the compound in the aqueous phase with which it is in contact under equilibrium conditions, range from about 150 to over 500. These high partition coefficients are thought to be a consequence of concomitant hydrogen bonding and hydrophobic interaction between the organic compound and the poly (amphiphilic) oligomeric or polymeric liquid.

In another embodiment, a carrier agent comprising a low molecular weight material which is highly miscible with the hydrophobic liquid and exhibits a strong affinity for the target compound can be admixed with the oligomeric or polymeric liquid to enhance the selectivity for a target component and/or its rate of transport through the liquid membrane. For example, in the case of removing the polar compound acetic acid from an aqueous solution, trioctyl phosphine oxide can be added to the hydrophobic liquid to improve permeability of the acetic acid target compound. Other low molecular weight carrier agents that could be used for specific applications will be apparent to those skilled in the art. In such cases, chemical modification of the liquid oligomer or polymer also may serve to enhance the affinity of the polymer liquid for the carrier agent(s), in order to retard any loss of the carrier agent from the immobilized liquid membrane. The addition level of the carrier agent to the oligomeric or polymeric liquid would be such that the viscosity and volatility characteristics of the liquid immobilized in the pores of the hydrophobic support would not be adversely affected, and the loss of carrier via precipitation or other partitioning from the liquid membrane does not occur.

Microporous supports suitable for use in the present invention and their methods of preparation are well known in the art and need not be described in detail. In this regard, please refer to U.S. Pat. Nos. 3,426,754; 3,801,404; 3,802,444; 3,839,516; 3,843,761; 3,843,762; 3,920,785; 4,055,696; 4,255,376; 4,257,997; 4,359,510; 4,405,688 and 4,438,185, the disclosures of which are hereby incorporated by reference. Broadly, any hydrophobic microporous material, i.e., a material not spontaneously wet by water, having an open-celled, interconnected structure can be used in the present invention. The membrane should have the smallest pore size consistent with efficient transport of the target compound(s), and the highest porosity and smallest thickness consistent with adequate mechanical integrity. The membrane support also should be composed of a material which is chemically stable to the aqueous feed or waste solution, the aqueous stripping solution which may be strongly acidic or basic, the oligomeric or polymeric liquid membrane, as well as other conditions that may be encountered in any specific application. Such materials may include polyolefins, polysulfones, polytetrafluoro-ethylenes, polystyrenes, polycarbonates and the like.

Microporous membranes meeting these descriptions are commercially available from several sources and are well known to those skilled in this art. In such materials, the micropores are interconnected through tortuous pathways which extend from one membrane surface or surface region to the other. The pores of commercially available microporous material fall predominantly in the range of about 0.02 to 2 microns in effective diameter, although the size of individual pores often vary considerably from the noted average pore size. Pores as small as 0.01 micron and are large as 10 microns are not unusual, and a specific pore size is not narrowly critical. Microporous materials having an average pore size of about 0.1μ provide stable liquid membranes using polypropylene glycol with a molecular weight of about 4000.

As noted above, the porosity must be sufficient to provide an open network through the support (open pore structure). Typically, commercially available microporous membrane supports will have a porosity of from about 30 to 80%, with a more usual porosity for an isotropic membrane like the Celgard® membrane being in the range of about 40 to 50%. Porosity is defined as the fractional volume (expressed as a percent) of the membrane that is open rather than substrate material. Porosity can be assessed in an alternative fashion by reference to the material's bulk density. Suitable microporous materials will have a bulk density lower than the bulk density of the same polymeric material having no cellular structure. Bulk density refers to the weight of the material per unit of its gross volume, where gross volume is the volume of fluid displaced, where the fluid such as mercury, exhibits a surface tension that prevents it from flowing into the micropores of the material. See mercury volumenometer method in *Kirk-Othmer Encyclopedia of Chemical Technology*, Vol. 4, page 892 (1949).

The pores of the microporous membrane support should be sized so as to retain the oligomeric and polymeric liquid by capillary action. With a proper combination of pore size and porosity, loading of the liquid oligomer or polymer into the porous matrix is easily accomplished, but capillary forces remain sufficiently strong to resist expulsion of the oligomer or polymer liquid from the support during use of the liquid membrane.

While the porosity of the support oftentimes will be uniform across its cross-section, in an alternative embodiment, the hydrophobic microporous support may have an asymmetric porosity. For example, the surface region of the support may have smaller pores and/or a lower porosity than the major matrix region, whose more open porosity facilitates transport of the target component. Such a construction may provide higher transfer rates relative to use of uniform porosity membrane supports. An asymmetric polysulfone membrane meeting such a construction is disclosed in U.S. Pat. No. 5,030,672, the disclosure of which is incorporated by reference.

Thinner membranes will provide higher transport rates of the target component through the composite liquid membrane. Membrane stability and support strength considerations, however, limit the extent to which this approach can be used to enhance performance. Typically, commercial membrane support (wall) thicknesses range between 10 and 200 microns.

One preferred hydrophobic microporous film useful as the microporous support in the present invention is the CELGARD® polypropylene materials available from Hoechst Celanese Separations Products Division, Hoechst Celanese Corporation, South Point, N.C. Such microporous materials are available either in sheet form or as microporous hollow fibers. Other useful materials include perfluorocarbon polymers, particularly of the type designated Gortex®, a trademark of W. L. Gore & Associates, Inc., Newark, Del., and the polypropylene hollow fibers available from Akzo N.V. under the Accurel® label.

An immobilized liquid membrane prepared by impregnating a polypropylene microfiltration membrane (CELGARD® 2400) with polypropylene glycol having a molecular weight of about 4000 maintained its integrity for more than a week when exposed on one side to an aqueous solution containing 20 wt % NaCl and on the other side to either pure water or a low conductivity aqueous solution. The liquid membrane allowed essentially no salt to pass through and exhibited very little water movement (diffusion).

Immobilized liquid membranes of the present invention oftentimes can easily be prepared by contacting the microporous support with the water-insoluble oligomeric or polymeric liquid. Due to their mutual hydrophobicity, the liquid readily wets the support and is imbibed into the porous matrix. For example, in the case of a hollow fiber microporous support, the immobilized liquid membrane can be prepared simply by filling the lumen of fiber with the oligomeric or polymeric liquid; followed, after an appropriate contacting period of about 10 minutes, with a water or other immiscible liquid rinse to remove excess oligomer or polymer. Alternatively, the membrane can be contacted with a solution of the oligomer or polymer, such as a 50 weight percent solution of the oligomer or polymer (e.g. PPG) in ethanol to facilitate pumping. The solvent (alcohol) is then removed by an air strip or vacuum drying.

In a similar fashion, regeneration of a degraded membrane oftentimes is easily accomplished by washing the membrane support with a volatile solvent, such as an alcohol in the case of polypropylene glycol liquid membranes, to remove residual oligomeric or polymeric liquid followed by further contacting with additional liquid to re-imbibe the support. The general simplicity in preparation and regeneration of the composite liquid membrane of the present invention relaxes to some degree the requisite membrane stability needed for a particular application relative to use of a membrane which could not be easily regenerated in place.

The immobilized liquid membrane of the present invention is particularly useful for selectively removing low levels of low molecular weight organic compounds, and particularly polar organic compounds such as alcohols, phenolic compounds, including phenol and substituted phenol, organic acids, including carboxylic acids, organic amines, including aromatic amines, ketones, aldehydes, esters, organic nitriles and the like, from aqueous streams containing high levels of inorganic salts which cannot pass through the liquid membrane. Such streams present a common disposal problem for industry due to the prevalent use of acid-base chemistry for organic synthesis. Normally, the presence of salts complicates treatment options, thus increasing disposal costs. The present invention provides a direct solution. The immobilized composite oligomeric or polymeric liquid membrane of the present invention is selected for its effective impermeability to water and particularly to highly water-soluble materials such as inorganic salts and ionic organic species. Such liquids allow ready transport of low molecular weight nonionized organic compounds and in particular polar organic compounds. Moreover, as noted above, the present invention provides a way for selective separation of a polar organic compound from other organic compounds in an aqueous medium based on differences in the physical properties of the various organic species.

In the case of ionized organic solutes, and particularly ionizable polar compounds, including phenolic compounds, aqueous solution pH generally has a substantial effect on the partition coefficient at any particular condition. Best results are obtained by conducting the separation after first adjusting the pH of the aqueous solution, as needed, to a pH of about 1 pH unit or more below the pKa of the targeted solute compound. The pKa of the solute is the pH at which the solute compound is 50% ionized in the aqueous solution. The intent is to establish a pH condition in the aqueous feed solution where the solute compound exists predominantly in a nonionized form. In fact, it is possible to obtain a high selectivity in the removal of one ionizable organic compound from another by adjusting the pH of the aqueous solution to between the pKa's of the respective organic species. This technique is illustrated in Example 27 which follows.

In use, the composite immobilized oligomeric or polymeric liquid membrane of the present invention may be positioned between two liquids, such as two aqueous solutions. One solution, e.g., an aqueous waste stream, which contains the target organic compound or compounds to be extracted, contacts one side of the membrane and an aqueous stripping solution contacts the other side to accept the target compound after it diffuses through the liquid membrane. The stripping solution can operate either in a passive mode, i.e., where the driving force for transport of the targeted compound from the liquid membrane simply is dilution, or in an active mode where the target compound is chemically altered upon passing from the liquid membrane into the stripping liquid. Chemical alteration of the target compound can be as simple as a change in its ionization state, such as from pH control, or a catalytic or biologically induced change. For example, a phenolic compound can be converted to its phenate salt via pH control using an alkaline material in aqueous stripping liquid.

In an alternate approach, the stripping side of the liquid membrane can be placed under a vacuum or swept with a gas, preferably inert, such as air or nitrogen, to remove the target compound by evaporation. This technique is made possible by the very low volatility of oligomeric or polymeric liquids as used in the present invention. Obviously this approach, referred to in the art as pervaporation, is useful only in those instances with the target compound exhibits a sufficient volatility.

In one useful embodiment, the aqueous solution containing the target compound(s) is circulated through the lumens of elongate hollow fibers having microporous walls supported in a housing, the fiber walls are imbibed with the water-insoluble or water-immiscible oligomeric or polymeric liquid and the stripping solution is circulated over the outside of the fibers. In another embodiment, referred to in the art as a plate-and-frame configuration, at least one immobilized liquid membrane, in a film form, is located within a liquid-tight housing and divides the interior of the housing into at least two chambers, an aqueous feed solution chamber and a stripping solution chamber. The immobilized liquid membrane provides communication between the two chambers. In both arrangements, the housing is provided with inlet and outlet ports or manifolds which permit aqueous feed solution and stripping solution to be introduced and discharged.

The following examples are given as specific illustrations of the present invention, and not for the purpose of limiting the invention. Reference should be made to the appended claims to determine the invention's scope. In these examples, the initial rate of transport of the various target compounds was, generally above 1.0 mg/hr-cm$^2$ and often above 2.0 mg/hr-cm$^2$. The combination of these high transport rates and a composite membrane stability consistently in excess of 12 hours, generally in excess of 24 hours and often in excess of 48 hours provides a particularly effective system for selective mass transfer.

EXAMPLE 1

A flat sheet microporous polypropylene membrane (Celgard 2400, 38% porosity, 0.05 micron average pore size, 25 micron thick) was wet with polypropylene glycol (PPG) MW 4000 obtained from the Dow Chemical Company by putting a few drops of PPG on the membrane sheet and spreading it out. The membrane absorbed PPG quite readily upon contact and became transparent when completely saturated with PPG. This change from a translucent to a transparent film allows convenient visual determination of the status of the liquid membrane. The excess PPG was wiped off and the membrane with immobilized PPG was ready for use. The membrane can be handled and stored for months at room temperature in air due to the practically nonvolatile nature of PPG. The same wetting procedure can be used for hollow fiber membranes. In a module form, the fibers can be wet by pumping PPG slowly through the lumens of the fibers. The excess PPG left in the fibers can thereafter be removed by either blowing air or passing water through the tube side of the fibers.

EXAMPLE 2

A flat sheet immobilized liquid membrane prepared according to Example 1 was placed between the two compartments of a cell. Surface area of the membrane was 8 cm$^2$. One cell compartment contained an aqueous waste solution containing para-nitrophenol (PNP) at a concentration of 4000 to 5000 mg/L and 20 wt % KCl. The other compartment contained 0.1N NaOH as an aqueous strip solution. Both solutions were circulated by pumps. Total volume of liquid on each side of the membrane was 100 ml. The system was at room temperature. PNP levels in both compartments were measured periodically using a spectrophotometric method. The initial rate of PNP transport across the membrane was about 5 mg/hr-cm$^2$ membrane. After overnight operation, the system had reached equilibrium with respect to PNP distribution. Concentration of PNP in waste side dropped to about 3 mg/L vs. about 3800 mg/L of PNP in the caustic side, a concentration difference of over 1000 times. The chloride content in the caustic strip solution, which is a good measure of KCl transport across the PPG liquid membrane, was found to be only 0.049 g/L, as compared with a concentration of over 100 g/L on the waste side. This corresponds to a separation factor, defined as the quotient or ratio of the stripping side ratio of PNP concentration to KCl concentration to the waste side ratio of PNP concentration to KCl concentration, for PNP over KCl of at least 2000.

EXAMPLE 2a

The process of Example 2 was repeated but with PEG-200 as the strip solution instead of 0.1N NaOH. PEG polymers have similar functionality to PPG polymers, but are highly water soluble. The initial rate of PNP transport across the membrane was slightly higher than found in example 2. PNP level in the waste solution dropped from 4700 ppm to 12 ppm after about 8 hours of operation, and to 0.6 ppm after two days.

EXAMPLE 2b

The process of Example 2a was repeated but with the strip solution being 50 wt. % PEG-200 in water. The initial rate of PNP transport across the membrane was about the same as found in example 2. PNP level in the waste solution dropped from 4449 ppm to 192 ppm after about 9 hours of operation.

EXAMPLE 2c

The process of Example 2, was repeated but with the Celgard support wetted with the following liquid membrane structure:

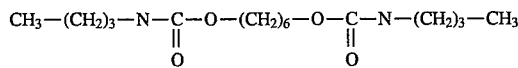

i.e., has a carbamate functionality. The initial rate of PNP transport across the membrane was twice as fast with PPG-4000. PNP level in the waste solution dropped from 4300 ppm to 25 ppm after 5.5 hours of operation, and to 5 ppm overnight.

EXAMPLE 2d

The process of Example 2c was repeated but with the waste solution containing about 1800 ppm caproic acid. The initial rate of caproic acid transport across the membrane was about the same as with PPF-4000. Caproic acid level in the waste solution dropped from 1800 ppm to 13 ppm after 23 hours of operation.

EXAMPLE 2e

The process of Example 2 was repeated but with the Celgard support wetted with castor oil, a triglyceride of fatty acids. The initial rate of PNP transport across the membrane was one-fourth of that obtained with PPG-4000. PNP level in the waste solution dropped from 4272 ppm to 4 ppm after 96 hours of operation.

EXAMPLE 2f

The process of Example 2 was repeated but with the Celgard support wetted with Igepal® CO-210. Having the structure:

$C_{19}H_{19}$-Phenylene—O—$(CH_2$—$CH_2$—O$)_{n-1}CH_2$—$CH_2$—OH (wherein n is 1.5) The initial rate of PNP transport across the membrane was comparable to that obtained with PPG-4000. PNP level in the waste solution dropped from 4397 ppm to 10 ppm after 24 hours of operation.

EXAMPLE 3

The process of Example 2 was repeated but with Celgard 2500 as the membrane support. This membrane support is as thick as Celgard 2400 but has somewhat bigger pores (0.075 micron average pore size) and a higher porosity (45%). The initial rate of PNP transport was about 8 mg/hr-cm$^2$ membrane, showing that the more open structure of this membrane support did enhance the transfer rate. Overnight the PNP concentration in the feed side and in the stripping side became 5 mg/L and 4430 mg/L, respectively.

EXAMPLE 4

The process of Example 2 was again repeated but with Celgard 2402 as the membrane support, which is the same as Celgard 2400 in pore size and porosity but twice as thick (50 microns). The initial rate of PNP transport was 2 mg/hr-cm$^2$ membrane. Overnight, PNP concentration in the feed side dropped to 10 mg/L and that in the stripping side rose to 4900 mg/L.

EXAMPLE 5

Celgard X20 400 hollow fibers (40% porosity, 0.065 micron pore size, internal diameter 400 microns, outer diameter 460 microns) were potted into a module containing 54 fibers that were 18 cm long. The total membrane area was 120 cm$^2$. PPG MW 4000 was pumped through the lumens of the fibers to wet them. Water was then pumped through to remove excess PPG. The module having PPG immobilized in the fiber walls was then used to remove PNP from an aqueous solution containing approximately 4000 to 5000 mg/L PNP and 20 wt % KCl. The aqueous stripping solution was 0.1N NaOH. The set up was similar to that used in Example 2. The initial rate of PNP transport across the hollow fiber membrane was about 4 mg/hr-cm$^2$ membrane area. After 3 hours of operation PNP concentration in the stripping side went up to 4400 mg/L and that in the feed side dropped to 45 mg/L.

EXAMPLE 6

Using a procedure similar to that of Example 5 but using polysulfone hollow fibers (Permea, St. Louis) as the membrane support, selective extraction of PNP from an aqueous waste solution was examined. Ultrafiltration polysulfone hollow fibers (18 cm long, MW cutoff 160,000, OD 1150 microns, ID 870 microns) were potted into a module containing 10 fibers that were 17.6 cm long. The effective membrane area was about 48 cm$^2$. The initial rate of transport was about 1 mg PNP/hr-cm$^2$ membrane area.

EXAMPLE 7

The process of Example 2 was repeated but with an aqueous feed (waste) solution having a pH of 5.8 and containing phenol (~5000 mg/L) and 20 wt % KCl. The initial rate of phenol transport was over 10 mg/hr-cm$^2$ membrane area. Overnight, PNP concentration in the feed dropped to about 5 mg/L and that in the stripping solution went up to about 5050 mg/L. Very little chloride was detected in the stripping solution.

Example 8

The process of Example 2 was again repeated but with the feed solution at a pH of 9 containing ~500 mg/L p-nitroaniline (PNA) and 20 wt % KCl. Also, the aqueous stripping solution was 0.1N nitric acid at a pH of 0.54. The initial rate of transport was about 1.5 mg/hr-cm$^2$ membrane area. Overnight PNA level in the feed dropped to 70 mg/L and that in the stripping solution went up to 450 mg/L. Very little chloride was detected in the stripping solution.

EXAMPLE 9

The process of Example 2 was repeated but with the aqueous feed solution containing formic acid, acetic acid or propionic acid at a concentration of 5 wt % in a solution containing 20 wt % KCl. The aqueous stripping solution was 0.1N NaOH and the process was operated at room temperature. The results obtained are shown in Table 1. Again, very little chloride was detected in the stripping solution after an overnight experiment.

TABLE 1

| Compound | Initial Rate (mg/hr-cm$^2$) |
|---|---|
| Formic Acid (C$_1$) | 1.0 |
| Acetic Acid (C$_2$) | 1.6 |
| Propion. Acid (C$_3$) | 5.4 |

EXAMPLE 10

The process of Example 2 was repeated but with the feed solution containing about 6 wt % ammonium sulfate and 1 wt % total of a variety of low MW organic compounds (nitriles, imides, and organic acids). Overnight about 40% of the organics were transported across the membrane, but no ammonium sulfate was detected in the stripping solution.

EXAMPLE 11

The process of Example 2 was repeated but using various silicone oils as the liquid membranes. The aqueous fed solution contained 4000 mg/L PNP and 20 wt % KCl. The aqueous stripping solution was 0.1N NaOH and the process was operated at room temperature. The results are shown in Table 2. Very little chloride was detected in the stripping solution after an overnight experiment.

TABLE 2

| Liquid Membrane | Initial Rate (mg/hr-cm$^2$) |
|---|---|
| Silicone Oils | |
| 975 mw | 0.17 |
| 5000 mw | 0.17 |
| 12500 mw | 0.13 |

EXAMPLE 12

A flat sheet immobilized liquid membrane prepared according to Example 1 was placed between the two compartments of a cell. Surface area of the membrane was 8 cm$^2$. One compartment contained an aqueous solution of various monobasic carboxylic acids. The other compartment contained 0.1N NaOH as the aqueous strip solution. Both solutions were circulated by pumps. Total volume of liquid on each side was 30 ml. The system was at room temperature. The relative rates of membrane transport for these acids and the corresponding partition coefficients are shown in Table 3. Note in Table 3 that the larger the acid, which is also more hydrophobic and more soluble in the polymer, the faster was its transport rate. This is clearly a consequence of its higher partitioning in the PPG liquid membrane as indicated by the magnitude of the partition coefficient.

TABLE 3

| Compound | Permeability (cm/sec) | Partition Coeff. (Kp)* |
|---|---|---|
| Formic Acid (C$_1$) | 0.055 × 10$^{-4}$ | 0.45 |
| Acetic Acid (C$_2$) | 0.10 × 10$^{-4}$ | 0.65 |
| Propionic Acid (C$_3$) | 0.33 × 10$^{-4}$ | — |
| Butyric Acid (C$_4$) | 0.42 × 10$^{-4}$ | 7.2 |
| Valeric Acid (C$_5$) | 1.6 × 10$^{-4}$ | 24.6 |
| Caproic Acid (C$_6$) | 4.0 × 10$^{-4}$ | 83 |

*Kp = Acid concentration in PPG ÷ Acid Concentration in H$_2$O at equilibrium.
Permeability is defined in Example 19.

EXAMPLE 13

Using a procedure similar to that described in Example 12, the effect of pH of the feed (waste) stream on transport of carboxylic acids through the liquid membrane was examined. It was determined that PPG liquid membranes transport monobasic carboxylic acids in their nonionized state effectively and significantly reject the ionized forms, as shown in Table 4 for formic acid which has a pKa of 3.75.

TABLE 4

| Membrane: | PPG 4000 in Celgard 2400 |
| Feed: | 4.4 wt % formic acid, 20 wt % KCl aqueous solution |
| Strip: | 0.1N NaOH solution |

| Solution pH | Rate, mg/hr-cm² membrane |
|---|---|
| 5.0 | 0.026 |
| 1.6 | 1.0 |

EXAMPLE 14

The process of Example 12 was repeated except that the feed was an actual waste stream containing a mixture of monobasic carboxylic acids from C2 to C6 having a total organic carbon (TOC) content of 2000 ppm. Organic levels in both compartments were measured periodically using a TOC machine. After about 7 hours, TOC level in the waste stream was reduced about 50%. After one day, about 500 ppm TOC was left in the feed, equivalent to about 80% removal.

EXAMPLE 15

The process of Example 12 was repeated but with Celgard 2500 as the membrane support. This membrane support is as thick as Celgard 2400 but has bigger pores (0.075 micron) and higher porosity (45%). After 4 hrs of operation about 60% of the TOC was removed and after 9 hrs about 80% was removed.

EXAMPLE 16

Same as Example 15 but the process was operated at 65° C., 92% TOC was removed after 6 hrs.

EXAMPLE 17

Celgard X20 400 hollow fibers (40% porosity, 0.065 micron pore size, internal diameter 400 microns, outer diameter 460 microns) were potted into a module containing 120 fibers that were 18 cm long. The total membrane area was 260 cm². PPG MW 4000 was pumped through the lumens of the fibers to wet them. Water was then pumped through to remove the excess PPG. Using a procedure similar to Example 12, this module with PPG immobilized in the fiber walls was then used to remove TOC from the waste solution mentioned in Example 14. Feed volume was 200 ml. The stripping solution was 10% sodium carbonate/borate (pH about 10) with a volume of 35 ml. Temperature was 60° C. After 6 hr, TOC in the waste dropped to 75 ppm, about 96% total TOC removal. Also, due to the difference in the volumes of feed solution vs. the strip solution, about 5-fold concentration of the organics was accomplished.

EXAMPLE 18

Same as Example 17 but operated at room temperature and using 500 ml feed volume. After 2 days of operation, feed TOC was 67 ppm. Based on TOC accumulated in the strip solution, a 13-fold concentration was achieved.

EXAMPLE 19

The effects of substituting various membrane supports in the processes of Examples 12 and 17 for removing TOC from an aqueous waste were studied and the results are shown below in Table 5. Permeability was measured by following the TOC level in the feed stream as a function of time and plotting the results. A plot of Ln(feed TOC) vs. time yields a straight line with slope equal to the product of permeability and membrane area divided by the feed volume. Thus, permeability can be determined from the following equation:

$$\text{Ln(Feed TOC)} = \text{(Permeability} \times \text{Membrane Area/Feed Volume)} \times \text{Time}$$

Note from Table 5 that the permeability is highly dependent upon the thickness and porosity of the membrane supports.

TABLE 5

| Effects of Supports | | |
|---|---|---|
| Membrane Support | Temperature °C. | Permeability × 10⁻⁴ cm/sec |
| Flat Sheet | | |
| ● Celgard ® (polypropylene) | | |
| Celgard 2400<br>t = 25 μm<br>dp = 0.05 μm<br>porosity = 38% | 25 | 0.9 |
| Celgard 2500<br>t = 25 μm<br>dp = 0.075 μm<br>porosity = 45% | 25 | 2.3 |
| ● Gore-Tex ® (PTFE) | | |
| 0.2 μm pore<br>78 μm thick<br>porosity = 78% | 25 | 1.8 |
| 0.1 μm pore<br>109 μm thick<br>porosity = 75% | 25 | 1.6 |
| Hollow Fiber | | |
| ● Polysulfone Hollow Fibers<br>asymmetric, 142 μm thick<br>160K MWCO, 76% porosity<br>OD = 1100, ID = 866 μm | 25° C. | 1.0 |
| ● Polypropylene Hollow Fibers<br>symmetric, thickness = 30 μm<br>OD = 460, ID = 400 μm<br>dp = 0.065 μm, 40% porosity | 25 | 1.3 |

EXAMPLE 20

The process of Example 2 was repeated but the Celgard 2400 membrane was impregnated with a polybutylene glycol (PBG) MW 2000 obtained from Dow Chemical Company. The initial rate of PNP transport across the membrane was about 3.3 mg/hr-cm² membrane. After overnight operation, the ratio of PNP concentration in the caustic side over the waste (feed) side was about 1300.

EXAMPLE 21

The process of Example 20 was repeated but polybutylene glycol with MW approximately 5000 was used instead. The initial rate of PNP transport was about 2.1 mg/hr-cm² membrane. Overnight operation yielded a PNP ratio (concentration of strip side to feed side) of 120.

EXAMPLE 22

The process of Example 2 was repeated, except the aqueous waste (feed) solution contained 7,000 mg/L maleimide and 40 wt. % ammonium sulfate. The initial rate of maleimide transport across the membrane was about 1.2 mg/hr-cm$^2$ membrane.

EXAMPLE 23

The process of Example 22 was repeated except the liquid membrane used was a solution of 30 wt. % Pluronic L-81 (from BASF Corporation) in PPG-4000. Pluronics are block copolymers of polyethylene glycol and polypropylene glycol, and thus possess hydrophobic properties intermediate between the two parent polymers. The measured initial rate of maleimide transport more than doubled (=2.5 mg/hr-cm$^2$ membrane). This example illustrates an approach in which various compatible polymers can be mixed for enhanced performance.

EXAMPLE 24

The process of Example 2 was repeated except the aqueous waste solution contained 1000 mg/L fumaronitrile and 40 wt. % ammonium sulfate. The initial rate of fumaronitrile transport was about 0.5 mg/hr-cm$^2$ membrane.

EXAMPLE 25

The process of Example 2 was repeated but with octanol, a typical organic solvent with high affinity for p-nitrophenol, as the liquid membrane. It was observed that octanol was so volatile that the octanol-impregnated membrane had to be handled very quickly in order to maintain the integrity of the liquid film. The initial rate of PNP transport across the membrane was about 5 mg/hr-cm$^2$ membrane, comparable to that obtained with PPG liquid membrane. However, the immobilized octanol liquid membrane broke down in about 10 minutes of operation probably due to a rapid change in static pressure from the osmotic pressure difference, allowing salts and caustic to pass through from one compartment to the other. This experiment demonstrates the superiority of immobilized PPG liquid membrane over conventional organic solvents in terms of membrane stability while approximately not suffering adverse effects on transport rate.

EXAMPLE 26

This example demonstrates the ability of an immobilized PPG liquid membrane to remove butanol from an aqueous solution in a pervaporation mode. Celgard 2500 (flat sheet microporous polypropylene membrane) was wetted with PPG-4000 and sandwiched between two compartments of a membrane cell as described in Example 2. One compartment was filled with a aqueous solution containing 5000 mg/L butanol. Air was swept in the other compartment to remove butanol diffusing through the membrane, thus creating driving force for further transport. The system was operated at 65° C. The initial rate of butanol removal was about 7 mg/hr-cm$^2$ membrane. After about 5 hr of operation, butanol concentration in the aqueous solution dropped to about 400 mg/L.

EXAMPLE 27

The process of Example 12 was repeated for acetic acid except the liquid membrane used was a solution of 50 wt. % trioctyl phosphine oxide (TOPO) in PPG-4000. TOPO has been used in solvent extraction processes for removing acetic acid from aqueous solutions. Being a weak base, TOPO interacts well with weak acids such as carboxylic acids. The permeability obtained with the TOPO-PPG liquid membrane was more than two times higher than that for the PPG liquid membrane alone.

EXAMPLE 28

The process of Example 14 was repeated except that the feed (actual waste) volume was 300 ml and the strip solution was 30 ml 1N NaOH. The run was carried out continuously for over two weeks, during which time about 80% of the TOC in the feed was removed resulting in an organic concentration in the strip solution about 9-fold higher than that of the initial feed. Separate measurements with the membrane before and after the two-week run showed basically the same permeability. This example demonstrates the stability of an immobilized PPG liquid membrane for extended periods under actual application conditions.

EXAMPLE 29

This example demonstrates the separation selectivity that can be achieved between compounds having different dissociation constants, i.e., p-nitrophenol (pKa=7.1) and benzoic acid (pKa=4.25), by varying the solution pH.

The procedure was the same as in Example 2 except the aqueous feed solution contained about 4000 mg/l PNP and 2000 mg/l benzoic acid in 20 wt. % KCl at pH 5.4, which is between the pKa of the two polar regime compounds. At this pH PNP exists in solution mainly in its unionized form whereas benzoic acid is practically totally ionized. PNP was found to pass readily through the membrane, resulting in about 99% PNP removal from the feed solution overnight. Benzoic acid, however, was virtually blocked by the membrane. After the overnight treatment only a trace amount of benzoic acid (<1% of feed) was detected in the aqueous strip solution. It should be noted that this separation was accomplished in the presence of a very high ionic strength (20 wt. % KCl), which would render ion-exchange methods practically inoperable for this separation.

EXAMPLE 30

To demonstrate the effect of pH and ionization on the transport rates further, the procedure of Example 29 was repeated but this time the pH of the aqueous feed solution was adjusted to 2.5, which is below the pKa of both of the polar organic compounds. Overnight, both PNP and benzoic acid were virtually gone from the feed, having been transported essentially completely to the strip side.

In the following examples the chain length (size) of PPG-4000 was extended by using various amounts of toluene diisocyanate (TDI) to link together PPG molecules. This was done to obtain PPGs with effective molecular weights larger than 4000 and to show that these higher molecular weight polymeric liquids were effective as supported liquid membranes.

EXAMPLE 31

About 6 g of PPG-4000 (from Aldrich) was mixed at room temperature with various amounts of TDI (technical grade, 80%, from Aldrich) to make up TDI/PPG-4000 molar ratio of 0 (no TDI added), 0.25, 0.5 and 1.0. These solutions were then heated at 60° C. for about 60 hours to complete the reaction before being cooled down to room temperature. It was observed that while the pure PPG-4000 appeared unchanged, the 0.25 molar mixture became much more viscous and the 0.5 and 1.0 molar solutions turned into thick gels. This is consistent with the fact that more TDI would result in a higher degree of chain linking of the PPG molecules.

The above TDI/PPG-4000 products were imbibed onto a Celgard 2400 support and the resulting supported liquid membranes were used to remove PNP from an aqueous solution similar to the procedure described in Example 2. The permeability measured for 0, 0.25 and 1.0 TDI/PPG-4000 membranes were $3.6 \times 10^{-4}$, $3.8 \times 10^{-4}$, and $2.6 \times 10^{-4}$, cm/sec, respectively. Overnight, the PNP level in the feed solution with the pure PPG-4000 membrane dropped to about 8 ppm, whereas the PNP levels for the other two cases were both below 1 ppm.

EXAMPLE 32

The same procedure as in Example 31 was repeated except that the Celgard 2400 support first was wetted with the various unreacted TDI/PPG-4000 solutions at room temperature prior to the heating at 60° C. for 60 hours to complete the reaction. This method would allow for the chain extension to occur within the pores of the Celgard support. The pure PPG membrane and the 1.0 TDI/PPG one were used for PNP removal. The permeability obtained for PPG and TDI/PPG membranes were $4.8 \times 10^{-4}$ and $5.3 \times 10^{-4}$ cm/sec, respectively. Overnight, PNP level in the feed dropped to about 2 ppm for the pure PPG membrane, and about 5 ppm for the other.

EXAMPLE 33

This example demonstrates the concept of chemically converting an organic compound (in this case an ester) transported through the liquid membrane into a different compound to prevent it from returning to the feed side. The process of Example 2 was repeated but with the feed solution containing 500 mg/L ethyl benzoate (an ester) at a pH of 7.1. The strip solution was the same: 0.1N NaOH. It is known that under alkaline pH an ester will be hydrolyzed into the corresponding acid and alcohol. Thus, as ethyl benzoate permeates through the membrane into the alkaline strip solution, it is converted to sodium benzoate, which is water soluble and does not permeate through PPG liquid membrane. The permeability of ethyl benzoate through the membrane at a temperature of 23° C. was about $9 \times 10^{-4}$ cm/sec. Overnight, ethyl benzoate concentration in the feed side dropped to 1 mg/L. Analysis of the strip solution showed benzoic acid present at a level of about 420 mg/L.

The principles, preferred embodiments and modes of operation of the present invention have been described in the foregoing specification. The invention which is intended to be protected herein, however, is not to be construed was limited to the particular forms disclosed, since they are to be regarded as illustrative rather than restrictive. Variations and changes may be made by those skilled in the art without departing from the spirit of the invention.

What is claimed is:

1. A supported liquid membrane comprising an oligomeric or polymeric liquid immobilized within a microporous Supp. A wherein said oligomeric or polymeric liquid is a hydrophobic poly (amphiphilic) compound containing a repeating unit of

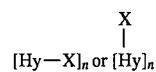

where Hy is a hydrophobic moiety and X is a polar moiety, and n is a number between 3 and 1000.

2. A supported liquid membrane of claim 1 wherein the microporous support is hydrophobic.

3. The liquid membrane of claim 1 wherein the hydrophobic moiety (Hy) is a linear or branched alkylene group of 3 to 7 carbon atoms.

4. The liquid membrane of claim 3 wherein the polar moiety X is selected from an ether linkage (—O—), an ester linkage

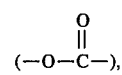

a carbonyl

a urethane linkage

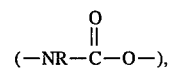

a urea linkage

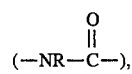

an amino (—NR—), a nitro

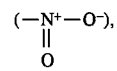

a sulfone

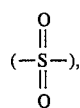

a sulfoxide

and phosphine oxides

where R is hydrogen, an alkyl group of 1 to 4 carbon atoms, a cycloalkyl of 4 to 8 carbon atoms, an aryl group, an alkyaryl group or an arylalkyl group.

5. The liquid membrane of claim 1 wherein the hydrophobic moiety (Hy) has the formula

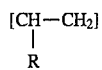

where R is an alkyl group of 1 to 4 carbon atoms, a cycloalkyl of 4 to 8 carbon atoms, an aryl group, an alkyaryl group or an arylalkyl group.

6. The liquid membrane of claim 5 wherein the polar moiety X is selected from an ether linkage (—O—), an ester linkage

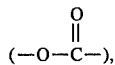

a carbonyl

a urethane linkage

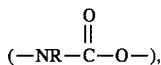

a urea linkage

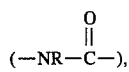

an amino (—NR—), a nitro

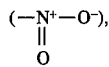

a sulfone

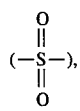

a sulfoxide

and phosphine oxides

where R is hydrogen, an alkyl group of 1 to 4 carbon atoms, a cycloalkyl of 4 to 8 carbon atoms, an aryl group, an alkyaryl group or an arylalkyl group.

7. The liquid membrane of claim 1 wherein said oligomeric or polymeric liquid is a poly(amphiphilic) compound selected from the group consisting of polyalkylene oxides, polyesters, polyureas, polyurethanes and functionalized polyolefins.

8. The liquid membrane of claim 1 wherein said poly(amphophilic) compound is a polyalkylene oxide.

9. The liquid membrane of claim 8 wherein said polyalkylene oxide has the formula H [O—$R^1$]$_n$ OH where $R^1$ is a linear alkylene group of 3 to 7 carbon atoms or is a substituted alkylene group of the formula

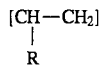

where R is an alkyl group of 1 to 4 carbon atoms, a cycloalkyl of 4 to 8 carbon atoms, an aryl group, an alkyaryl group or an arylalkyl group, and n is a number between 5 and 1000.

10. The liquid membrane of claim 9 wherein said polyalkylene oxide is a polypropylene glycol or a polybutylene glycol.

11. The liquid membrane of claim 10 wherein said polybutylene glycol has a molecular weight of at least about 1000.

12. The liquid membrane of claim 10 wherein said polypropylene glycol has a molecular weight of at least about 2000.

13. The liquid membrane of claim 10 wherein said polyolefin is polypropylene.

14. The liquid membrane of claim 10 wherein said hydrophobic microporous support is made from polypropylene.

15. The liquid membrane of claim 8 wherein said polyalkylene oxide has a molecular weight of at least about 1000.

16. The liquid membrane of claim 15 wherein said hydrophobic microporous support is made from polypropylene.

17. The liquid membrane of claim 1 wherein said poly(amphiphilic) compound is:

$CH_3$—$(CH_2)_3$—N—C(O)—O—$(CH_2)_6$—OC(O)—N—$(CH_2)_3$—$CH_3$.

18. The liquid membrane of claim 1 wherein said poly(amphiphilic) compound is:

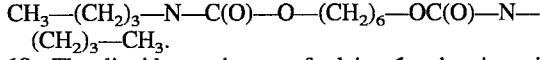
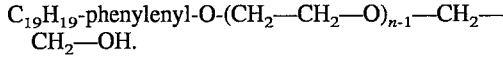

19. The liquid membrane of claim 1 wherein said microporous support is wettable by said poly(amphiphilic) compound.

20. The liquid membrane of claim 1 wherein said hydrophobic microporous support is made from a material selected from the group consisting of polyolefins, polysulfones, polytetrafluoroethylenes, polycarbonates and polystyrenes.

21. The liquid membrane of claim 20 wherein said hydrophobic microporous support is a polyolefin film.

22. The liquid membrane of claim 21 wherein said polyolefin is polypropylene.

23. The liquid membrane of claim 20 wherein said hydrophobic microporous support is a hollow polyolefin fiber.

24. The liquid membrane of claim 20 wherein said liquid is selected from the group consisting of polyalkylene oxides, polyesters, polyureas, polyurethanes and functionalized polyolefins.

25. A supported liquid membrane comprising a hydrophobic polypropylene glycol or polybutylene glycol oligomeric or polymeric liquid immobilized within a microporous polypropylene support.

* * * * *

UNITED STATES PATENT AND TRADEMARK OFFICE
CERTIFICATE OF CORRECTION

PATENT NO. : 5,507,949
DATED : April 16, 1996
INVENTOR(S) : Sa V. Ho

It is certified that error appears in the above-indentified patent and that said Letters Patent is hereby corrected as shown below:

Col. 19, line 65, delete "Supp. A" and insert therefor --support--.

Signed and Sealed this

Twenty-fourth Day of September, 1996

Attest:

BRUCE LEHMAN

*Attesting Officer*    *Commissioner of Patents and Trademarks*